United States Patent [19]

Collins et al.

[11] 4,299,031
[45] Nov. 10, 1981

[54] PLOTTING DEVICE

[75] Inventors: Basil C. Collins, Ealing; Michael Bartholomew, Edgware; Roy H. Perry, Hillingdon, all of England

[73] Assignee: Metal Box Limited, Reading, England

[21] Appl. No.: 41,732

[22] Filed: May 23, 1979

[30] Foreign Application Priority Data

May 24, 1978 [GB] United Kingdom ............... 22049/78

[51] Int. Cl.$^3$ ............................................. B43L 13/00
[52] U.S. Cl. .................................... 33/18 R; 33/1 M; 33/189; 346/49; 346/141
[58] Field of Search ...................... 33/18 R, 1 M, 189; 346/46, 49, 50, 51, 29, 141

[56] References Cited

U.S. PATENT DOCUMENTS

| 2,936,207 | 5/1960 | Beaumont et al. | 346/29 |
| 3,340,541 | 9/1967 | Klassen et al. | 346/141 X |
| 3,543,279 | 11/1970 | Rempel et al. | 346/141 |
| 3,550,276 | 12/1970 | Kramer et al. | 33/1 M |
| 3,757,423 | 9/1973 | Wieg | 33/1 M |
| 3,864,695 | 2/1975 | Nagashima et al. | 33/18 R |

*Primary Examiner*—William D. Martin, Jr.

*Attorney, Agent, or Firm*—Diller, Ramik, & Wight

[57] ABSTRACT

This disclosure relates to a multiple head for a remotely controllable plotting device in which a body carries a plurality of pen carriers each of which in turn carries a pen having a tip, each pen carrier including a hollow bobbin of non-magnetic material having an axial bore for movement of a pen therealong in a generally downward advancing direction and an opposite retracting direction, in electromagnetic coil surrounding the bobbin, a first magnetic element movable with the pen axially with respect to the bore, a second magnetic element carrried by the bobbin, at least one of the magnetic elements being a magnet whereby when the coil is energized, it influences the first magnetic element to cause the pen to move in one of the directions depending upon the sense in which the coil is energized, the first and second magnetic elements cooperating to hold the pen in a retracted position, the bore defining an axis and the axes being convergent in a single common point externally of the bobbin such that when any one pen is retracted from a position in which its tip is at the common center, and the other one of the pens can be advanced to a position in which its tip is at precisely the same common point without any movement of the body taking place.

9 Claims, 5 Drawing Figures

PLOTTING DEVICE

This invention relates to a plotting device of the remotely controllable kind having a movable head including at least one carrier for an instrument such as a pen, the carrier being adapted to permit the instrument to be moved with respect thereto between an operative and an inoperative position; to multiple heads for mounting pens in such plotting devices; and to pen carriers for such plotting devices.

The term "pen" is used herein in a generic sense to mean a said instrument, being an instrument of generally elongate form, for use in a remotely controlled plotting device (as hereinafter defined) to make a mark, impression or other analogous locally applied change of state on or in the surface of a body, which latter is typically in sheet form, for example a sheet of paper, but which may not necessarily be flat and which may not necessarily be in the form of a sheet. The marks or impressions may be in the form of indicia such as lettering, drawings or diagrams, or may be in the form of functional elements such as indentations associated with conductors and/or other components of a printed electrical circuit. Thus the term "pen" comprises non-limitingly within its scope marking, and tracing instruments and tools for scribing or engraving, or for printing electrical circuits. The "pen" itself does not per se form a part of the invention.

A "plotting device" in this specification means a device of the kind specified above and suitable for making a mark, trace or the like on a surface. Examples include automatic or semi-automatic plotters for making drawings, charts or maps, recorders for making graphic traces of instrument readings, scribing or engraving machines, and electrical circuit board printing machines.

Although plotting devices, in the sense explained above, may take many different forms depending on the purpose for which they are intended, there is often a requirement for the pen (as above defined) to be only intermittently in contact with the surface being worked on. In the case of an instrument recorder or draughting machine, for example, a single pen may be required to make broken lines. For this purpose the pen needs to be so mounted that it can be retracted away from the surface of the paper and placed in contact with the paper, often repeatedly. The movement should be virtually instantaneous so as not to impair the accuracy of the work. A similar requirement exists in the case of engraving machines or circuit board printing machines.

In the case of a plotting device having only a single pen, it is possible to arrange for the whole head to be moved so as to bring the pen into and out of contact with the working surface. This, however, can involve moving a relatively large mass, which is cumbersome and which militates against speed of operation. Particularly in the case of computer-controlled plotting devices, it is desirable that every reaction of the device to a signal from the computer shall be limited only by the speed of which the computer is capable, and not by mechanical characteristics such as inertia, in the plotting device itself.

In some applications, furthermore, the carriage may be required to apply selected ones of several pens. Where the pen is an ink pen, for example, several colours may be called for so that one pen for each colour is provided. Another case in which several "pens" may be required is where the mark or impression is of different widths, so that for example in the case of an engraving or printed circuit printing machine, a number of tools each of a different width from the others may be arranged to be selected individually. To this end, some form of pen-changing device is necessary, and since it is generally a requirement that when pens are changed the new pen shall be brought into contact with the same point on the working surface as that from which the previous pen was removed, it is desirable that all the pens be associated with a single head.

In one form of pen-changing device currently employed in a plotting machine for graphic reproduction, the pen carriage supports a single pen during operation but further pens are stored in a magazine separate from the head. When a change of pen is required, the head is moved to the magazine and parks there the pen which it is holding, then selects another and returns to the place where it had been working. This arrangement not only wastes time but involves a relatively complicated mechanism.

Whether the movement of the pen is for pen-changing purposes or whether it is effected in order temporarily to remove a single pen from the working surface, it is desirable in the interests of speed of operation, accuracy and reliability to arrange that the mass to be moved shall be as small as possible, and ideally this means that only the pen itself would need to be moved into and out of contact with the working surface. In addition, the extent of such movement should be as small as possible and its nature should be as simple as possible, i.e. a mere shift in a straight line.

According to the invention in a first aspect thereof, a pen carrier for a remotely controllable plotting device (as hereinbefore defined) comprises a hollow bobbin, of non-magnetic material and having a bore defining an axis thereof and adapted to permit axial movement of a pen (as hereinbefore defined) along the bore, a first magnetic element arranged to be movable with the pen, and a second magnetic element carried by the bobbin, at least one of said magnetic elements being a magnet and the bobbin having around it an electromagnet coil, the coil and the magnetic elements being so disposed that, when the coil is energised in one sense, it influences the first magnetic element so as to cause the pen to move to a first axial position, that when it is energised in the opposite sense it influences the first magnetic element so as to cause the pen to move to a second axial position, and that said first and second magnetic elements cooperate with each other to hold the pen in said second position.

Thus the coil, when energised, sets up an electromagnetic field which overcomes the influence, of that one of the said magnetic elements which is a magnet, on the other magnetic element, thus urging the pen towards its second axial position or allowing it to move there by virtue of outside influence, for example gravity. It will be appreciated that this permits the pen to undergo no more than a relatively short, simple movement in a straight line, and that the pen carrier itself does not need to move; still less does a head in which the pen carrier is mounted have to do so.

The pen carrier may include a pen holder movable axially in the bore of the bobbin, for effecting said axial movement in the bobbin of a pen held by the holder. In this case the only parts moving during retraction of the pen from the working surface, or application of the pen to the working surface, are the pen and the pen holder.

The latter can be of very light construction so as to have an insignificant effect on the total mass to be moved towards and away from the working surface.

Where a pen holder is provided, the said first magnetic element is preferably comprised in the pen holder. Preferably, the pen holder, if provided, comprises a non-magnetic portion and said first magnetic element, the latter extending over only a part of the length of the pen holder.

That particular one of the said magnetic elements which is a magnet is preferably in the form of a permanent magnet. If this is the second of the said elements, i.e. that carried by the bobbin, then the first element is a piece of magnetic material, carried by, or part of, the pen holder or pen. Alternatively the second magnetic element may not itself be a magnet, in which case the magnet is carried by, or part of, the pen holder or pen.

According to the invention in a second aspect thereof, a pen carrier according to said first aspect of the invention, and having a said pen holder, is provided in combination with a pen (as hereinbefore defined) the pen being carried by the pen holder.

According to the invention in a third aspect thereof, a pen carrier according to said first aspect of the invention is provided in combination with a pen (as hereinbefore defined), the pen being carried by the bobbin within the bore thereof and being axially movable in direct contact with the bore.

According to the invention in a fourth aspect thereof, there is provided, for a remotely controlled plotting device (as hereinbefore defined), a multiple head, i.e. a unit movable over a working surface and adapted to hold a plurality of pens (as hereinbefore defined) so that a selected one or more of the said pens can perform an operation on the working surface, the head comprising a body having secured thereto a plurality of pen carriers each of which is a pen carrier according to the said first aspect of the invention.

Preferably, in such a multiple head the said body has a plurality of holes therein, each having an axis, the axes of the holes being convergent in a single common point external to the body, and a respective one of the pen carriers being secured coaxially in each hole equidistantly from said common point, so that when a pen is carried by each pen carrier, any one of said pens when in its second axial position has its tip at said common point. In this way, when one pen is exchanged for another, the new pen engages the working surface at the same point on the latter from which the previous pen has been removed, without any movement of the components taking place other than that of the pens (and pen holders, if provided).

According to the invention in a fifth aspect thereof, there is provided a remotely controllable plotting device (as hereinbefore defined) having a multiple head according to said fourth aspect of the invention, with or without pens (as hereinbefore defined) carried in the pen carriers of the head.

An embodiment of the invention will now be described, by way of example only, with reference to the accompanying drawings in which.

Figure 1:
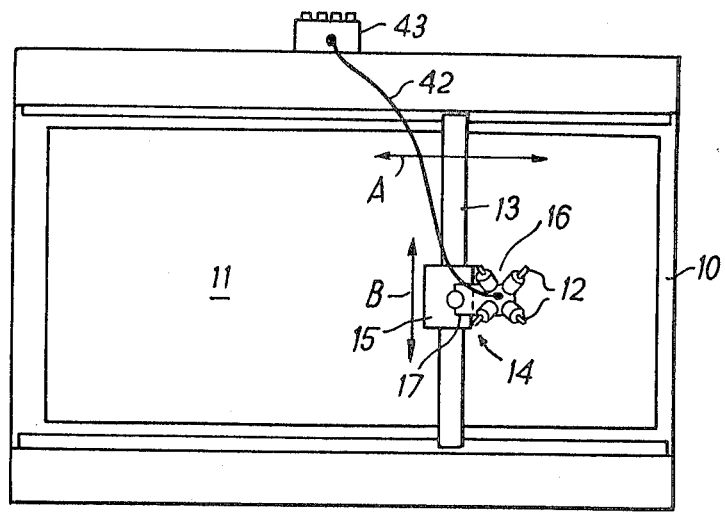
FIG. 1 is a simplified plan view of a plotting device in the form of an automatic draughting machine of the horizontal flat bed type, embodying the invention.

The draughting machine shown in FIG. 1 is, in general, of a known kind comprising a flat bed 10 on which may be mounted a sheet of paper 11 on which a drawing, chart, map, graph or the like may be made by the machine automatically by means of four pens 12, any one of which can be selected at any time and which are brought into operation in a manner to be described hereinafter.

The machine includes a beam 13 which is movable to and fro over the bed 10 as indicated by the arrow A, to effect longitudinal traverse; whilst a pen carriage 14 is carried by the beam 13 and movable to and fro along it as indicated by the arrow B, to effect lateral traverse. The driving means for the beam 13 and pen carriage 14 are conventional and need not be described here, and are remotely controlled by a computer or other suitable control means in known manner, according to a preselected programme; or according to decisions made by an operator as the work proceeds.

Figure 2:
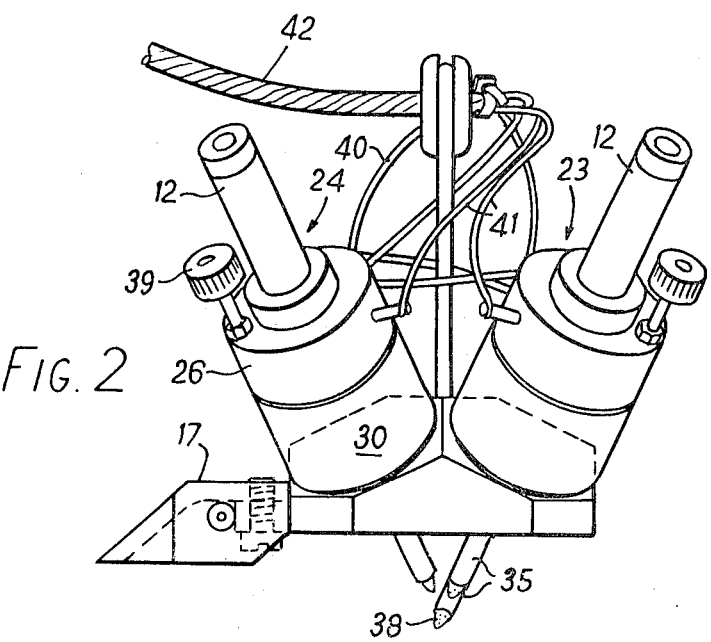
FIG. 2 is a side elevation of a multiple head according to the invention and forming part of the draughting machine shown in FIG. 1.
Figure 3:
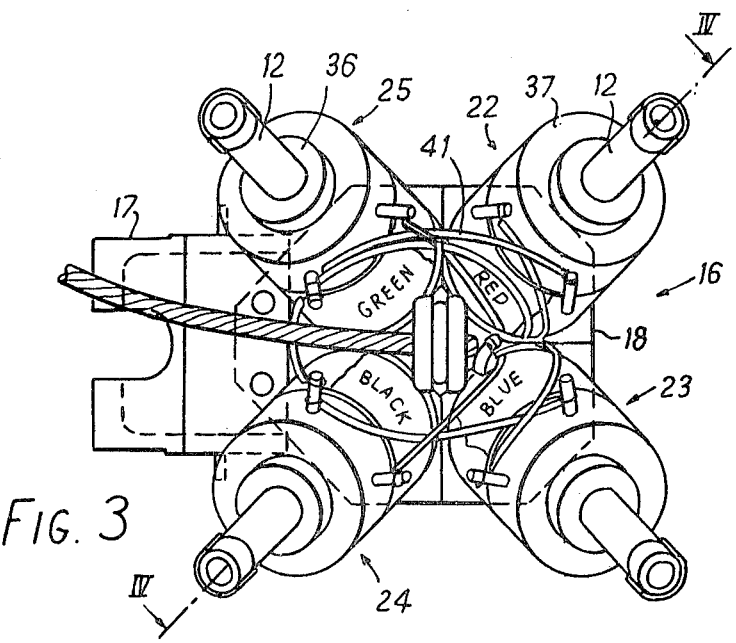
FIG. 3 is a plan view on FIG. 2.
Figure 4:
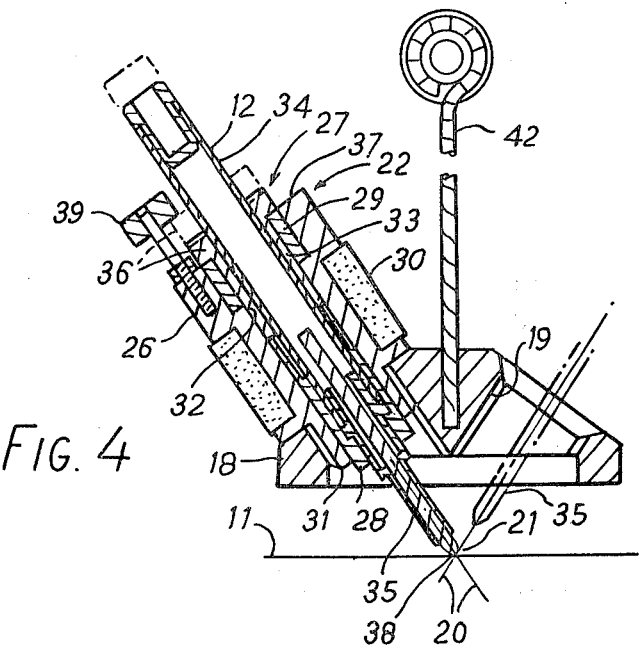
FIG. 4 is a sectional elevation taken on the line IV—IV in FIG. 3.

The pen carriage 14 consists of a base member 15 adapted to be moved along the beam 13, and a multiple drawing head 16 which is secured to the base 15 by means of an attachment shoe 17 (FIGS. 2 and 3). Referring now to FIGS. 2 to 4, the multiple head 16 comprises a body 18 having a plurality of holes 19 and a corresponding number of pen carriers each of which is secured in a respective one of the holes 19. The axes of the holes (such as shown at 20 in FIG. 4) are inclined to the vertical and intersect each other at a common point 21 below the body 18. The pen carriage 14 and the beam 13 (FIG. 1) are so arranged that this point 21 lies on the surface of the sheet of paper 11 in any position of the carriage and beam. In this example there are four holes 19, arranged in a symmetrical cruciform pattern, and four pen carriers 22, 23, 24 and 25. The attachment shoe 17, which can be of any suitable design and which may be interchangeable so as to enable the head 16 to be used in a variety of different machines, is attached to one side of the multiple head body 18. All of the pen carriers 22 to 25 are identical with each other, and the carrier 22, which is shown in section in FIG. 4 (from which the carriers 23, 24 and 25 are omitted for clarity), will now be described with particular reference to that Figure.

The pen carrier 22 comprises a hollow bobbin 26 of a non-magnetic material such as plastics; pen holder 27, including a first magnetic element in the form of a hollow cylindrical steel core 28, the pen holder 27 being arranged to be movable with a pen 12 which is carried by the pen holder 27; a second magnetic element, in the form of a permanent magnet 29, carried by the bobbin 26; and an electromagnet coil 30 wound around the bobbin.

The bobbin 26 is cylindrical and has at its lower end a coaxial, threaded boss 31 which is removably screwed into the corresponding hole 19 in the body 18 of the multiple head. The bobbin has a coaxial bore 32 in which the pen holder 27 is axially movable; the magnet 29 is in the shape of a ring mounted around the upper end of the bore 32. The pen holder 27 comprises two components, viz. the cylindrical steel core 28 and a tubular upper member 33, which is spigoted into the upper end of the core 28, so that the two members, 28 and 33, end to end, define a continuous hollow cylinder, in which the barrel 34 of the pen 12 is held with its stylus portion 35 protruding downwards below the pen carrier 22. The pen 12 may be of any known kind suitable for the purpose for which the draughting machine is intended; and the internal dimensions of the pen holder 27 are so determined as to fit the pen, so that the pen moves axially with the pen holder in the bore 32 of the bobbin. The upper member 33 of the pen holder is of any suitable non-magnetic material, such as plastics or aluminium, and has at its outer end a flange 36 overlying the upper end face 37 of the bobbin. The coil 30 is nearer to the bottom end of the bobbin 26 than is the ring magnet 29.

The operation of the pen carrier 22 takes place as follows. The pen 12 is normally in the retracted or inoperative axial position indicated by chain-dotted lines in FIG. 4, being held in this position by the influence of the ring magnet 29 on the steel core 28 of the pen holder. When it is desired to bring the pen into use, the electromagnet coil 30 is momentarily energised. This produces a magnetic field which is in an opposite direction to, and more powerful than, that of the ring magnet 29, and which therefore influences the magnetic core 28 so that the pen holder 27 commences a downward movement. The pen holder continues to move downwards entirely by gravity, until it reaches the extended or operative position as shown in detail in FIG. 4. In this position the tip 38 of the pen engages the surface of the paper 11 at the common point 21; and it should be noted that thereafter, as the pen carriage 14 is moved over the paper, the pen rests on the latter entirely by virtue of its own weight, being free to move up and down axially with respect to the bobbin 26 to compensate for any minor local variations in the vertical distance between the pen carriage and the paper. However, downward movement from the operative position of the pen is prevented by the engagement of the pen holder flange 36 with the bobbin, the former thus serving as a lower stop means.

To return the pen to its retracted position, the coil 30 is again energised momentarily, but this time in the opposite sense so as to draw the core 28 upwards until, under its own momentum, it is attracted and held by the ring magnet 29. An upper stop 39, preferably of the adjustable kind, is carried by the bobbin 26 to abut the flange 36 in the retracted position of the pen.

Figure 5:
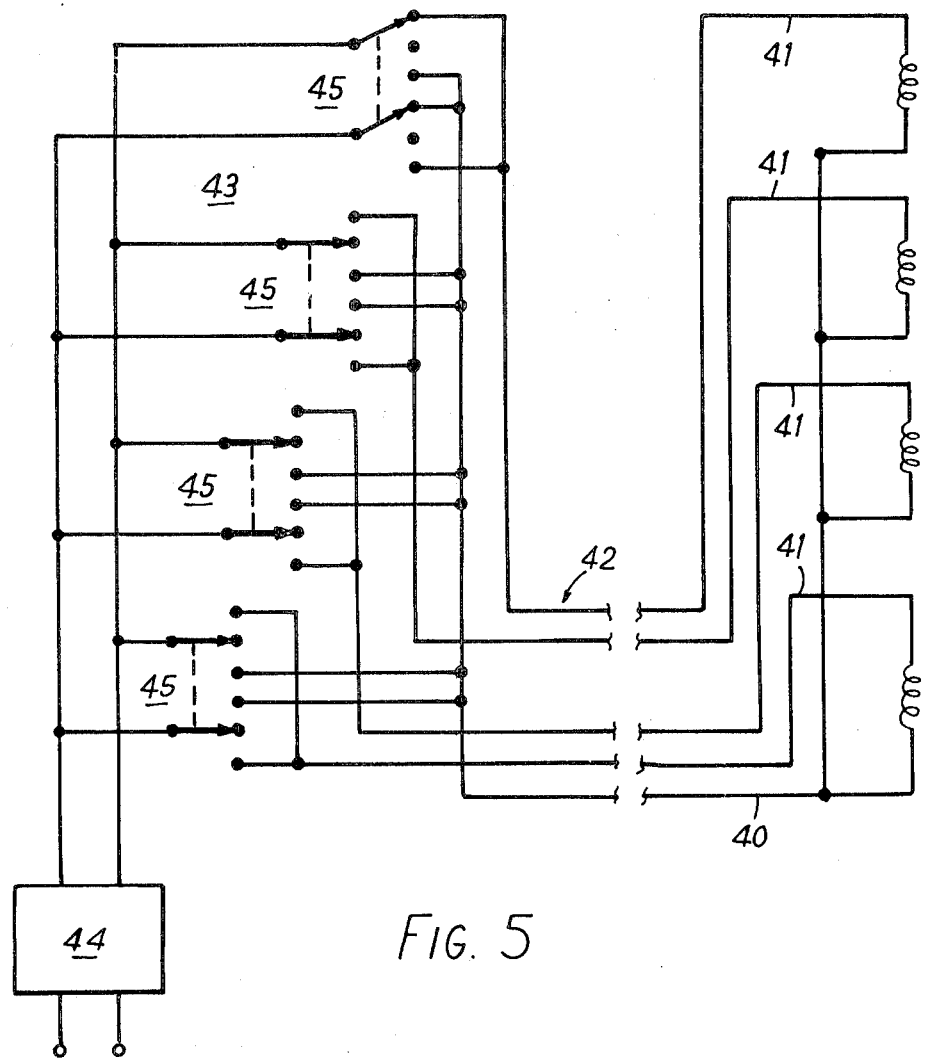
FIG. 5 is a diagram illustrating principal parts of a simple control system for effecting changes between pens carried by the pen carriage shown in the other Figures.

FIG. 5 shows one very simple circuit for control of the pen-changing facility by an operator. In this circuit one end of each of the four coils 30 is connected to a common return line 40 and the other end to an individual supply line 41, the lines 40 and 41 being grouped into a flexible cable 42 (FIGS. 1 to 4) which leads to a control unit 43 on a fixed part of the draughting machine. The control unit 43 includes a suitable unit 44 for generating pulses of direct current of the correct duration for energising any one of the coils 30. The unit 44 is connected to the lines 40 and 41 through reversible switches 45 biassed to an open position. Each switch is operated in one direction to retract the corresponding pen and in the other to bring it into operation. It will be readily apparent that this control system may be modified, in any well-known manner for example in such a way that whenever a switch is operated to bring a new pen into use, this automatically causes any pen not already retracted to be retracted first without the need to operate two switches. Automatic switching of any known kind may be provided, and is indeed necessary where the machine is arranged for operation in response to a predetermined programme, e.g. under control of a computer.

In one modified embodiment of a movable head, the pen holder is in the form of a single tubular member of plastics or other non-magnetic material, which may however be generally of the same shape as the two-piece pen holder 27. In this arrangement, the magnetic function of the core 28 can be performed by an element of magnetic material which may be attached to the pen holder, or which may be attached to, or even form part of, the pen itself. The last-mentioned arrangement is particularly applicable when the pen is of a kind which already includes an element of steel, such as the shaft of a scribing tool or a similarly placed part of another tool.

In a further variation in which the pen holder is of non-magnetic material, the element of magnetic material attached to the pen holder or to the pen itself may be the permanent magnet. In that case the magnetic element carried by the bobbin need not be itself a magnet. Conveniently this latter element may then be the upper end stop 39.

It will be realised that, provided the electromagnet coil 30 is capable of carrying a sufficiently strong electric current to perform satisfactorily, both of the magnetic elements (corresponding to the magnet 29 and magnetic core 28) may consist of permanent magnets, thus providing a more powerful force for retaining the pen in its retracted position. This may be desirable where the "pen" is a scribing or other tool subject to a certain amount of vibration which may be transmitted from the working tool of a tool head to its retracted fellows.

Where the pen has a barrel of plastics material, or where the pen holder is of plastics material, a magnetic element may readily be incorporated therein by moulding it intergrally into the barrel or pen holder. In one form, such an element may for example, consist of a coaxial steel ring or a series of coaxial steel rings joined together by longitudinal webs; alternatively it may comprise a cage having a series of longitudinal steel strips joined together at one or each end by a ring portion. A similar element can be moulded into the bore of the bobbin where the latter is of plastics and the permanent magnet is carried by the pen or pen holder.

The pen holder may be entirely absent, so that the pen is axially movable in direct contact with the bobbin bore. In this case one of the magnetic elements must be carried by the pen so as to achieve relative movement between itself on the one hand and, on the other hand, the other magnetic element and the electromagnet coil.

The body of the head may be in the form of a light structure including integral portions around which the electromagnet coils are wound, the bobbins then being preferably in the form of simple tubes of light weight, fitted within the portions carrying the coils. The body may in fact consist of no more than these portions, joined together adjacent the coils and having means for preventing the bobbins from falling out. The coil-carrying portions may advantageously be in the form of radial fins, giving ample air space for dissipation of heat from the electromagnet coil when necessary. The whole of the body may be of aluminium or other suitable metal, but preferably a metal that can be die-cast, or alternatively it may be of injection moulded plastics.

The control system may be modified in known manner so as to cause a standing electromagnetic field to be maintained by the coil 30 to supplement the co-operating action of the two magnetic elements 28 and 29 when the pen is in its retracted position.

It will be understood that many other variations may be made to the arrangements described. FIG. 3 shows the pen carriers 22 to 25 marked for pens of different colours. The variation between one pen and another may be in width of tip rather than in colour. The instrument carried by each pen carrier need not be an ink pen for writing, drawing or tracing, but may be any instrument falling within the definition, earlier in this specification, of the word "pen" as it is used herein. Where in place of ink pens other types of instrument are used, certain modifications may be desirable or necessary. For example, in the case of a scriber or engraving tool of the kind which acts as an electrode for an electrical spark to create indentations in the working surface, means must be provided for maintaining the required consistency of the width of the gap between the tip of the tool and the working surface. For this purpose the body 18 of the tool head may have a downward projection or foot, preferably adjustable in length, and preferably having a rounded bottom end to travel on and in contact with the working surface. The bottom of the foot may alternatively carry a freely rotatable ball.

Where the plotting device is to be used for a purpose in which the tool needs to be pressed against the working surface so as to apply an axial force to the latter, it can be prevented from moving axially with respect to the pen carrier during the working period of the tool by so disposing the electromagnet coil and the magnetic element associated with the tool (which latter may be the tool itself) with respect to each other that by maintaining the coil in an energised condition, the tool tends to be forced, in its operative position, against the working surface. In such a case the lower stop would be so positioned as to allow a small axial gap between the stop surfaces (corresponding to the lower surface of the flange 36 and the upper end surface 37 of the bobbin 26 in the example shown in the drawings) when the tool is in its operative position. Examples include scribing and engraving tools, particularly for working on plastics or other relatively soft materials.

Pen carriers as above described and discussed are suitable for use in plotting devices adapted to work on working surfaces other than flat surfaces since the pen carrier body is held away from the working surface and the working tips of all the pens (in whatever form and whether or not each one consists of an ink pen or other instrument or tool) will, in their operative position when the pen carriage 14 is a given position with respect to the working surface, always be directed to the same point, such as the point 21 in the drawings.

Pen carriers as described above may be provided as a relatively low cost accessory to plotting devices, not being integral with such devices. The pen carrier as described and illustrated herein is designed to fit a Bryans 26,000 series X-Y recorder. By making minor modifications to the shoe 17, the pen carrier may readily be fitted to other suitable plotting devices.

We claim:

1. A multiple head for a remotely controllable plotting device, the head comprising a body, a plurality of pen carriers secured to the body, and a plurality of pens each having a tip and being carried by a respective said carrier, each pen carrier comprising: a hollow bobbin of non-magnetic material having a bore for axial movement of a pen therealong in a generally downward advancing direction and an opposite retracting direction, an electro-magnetic coil around the bobbin, a first magnetic element movable with the pen axially with respect to the bore, a second magnetic element carried by the bobbin, at least one of said magnetic elements being a magnet, whereby when the coil is energized it influences the first magnetic element to cause the pen to move in a said one of said directions depending on the sense in which the coil is energized, said first and second magnetic elements cooperating to hold the pen in a retracted position, said bore defining an axis and said axes being convergent in a single common point external to the bobbin such that when any one pen is retracted from a position in which its tip is at said common point, any other one of the pens can be advanced to a position in which its tip is at precisely the same common point without any movement of the body taking place.

2. A head according to claim 1, wherein each pen is mounted freely in the corresponding said bore, means other than said coil and magnetic elements for influencing axial movement of the pen being absent, whereby when the pen is advanced, after an initial momentary energization of the coil in the appropriate sense to overcome the influence of the second magnetic element on the first magnetic element, the remainder of the travel of the pen in the advancing direction is entirely under gravity.

3. A multiple head according to claim 1 including a pen holder movable axially in the bore of each bobbin for effecting said axial movement in the bobbin of a pen held by the holder.

4. A multiple head according to claim 3, wherein each said first magnetic element is comprised in the corresponding pen holder.

5. A multiple head according to claim 4, wherein each pen holder comprises a non-magnetic portion and the corresponding said first magnetic element, the latter extending over only a part of the length of the pen holder.

6. A multiple head according to claim 5, wherein the non-magnetic portion of each pen holder is tubular and is fixed endwise to a further tubular portion constituting the corresponding first magnetic element.

7. A miltiple head according to claim 1 wherein each said second magnetic element is in the form of a ring encircling the bore of the corresponding bobbin.

8. A multiple head according to claim 1 or claim 2, wherein the body has a plurality of holes therein, each having an axis, the axes of the holes being convergent in the said single common point external to the body, and a respective one of the pen carriers being secured coaxially in each hole equidistantly from said common point.

9. A remotely controllable plotting device having a multiple head according to claim 1.

* * * * *